United States Patent
Kurabayashi (10) Patent No.: US 12,517,779 B2
(45) Date of Patent: Jan. 6, 2026

(54) METHOD, PROGRAM, SYSTEM, AND DEVICE FOR ESTIMATING CAUSE OF PROBLEM

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 34 days.

(21) Appl. No.: 18/444,056

(22) Filed: Feb. 16, 2024

(65) Prior Publication Data

US 2024/0184660 A1 Jun. 6, 2024

Related U.S. Application Data

(63) Continuation of application No. PCT/JP2022/030951, filed on Aug. 16, 2022.

(30) Foreign Application Priority Data

Aug. 17, 2021 (JP) ................................ 2021-132934

(51) Int. Cl.
*G06F 11/00* (2006.01)
*A63F 13/40* (2014.01)
(Continued)

(52) U.S. Cl.
CPC ............ *G06F 11/079* (2013.01); *A63F 13/40* (2014.09); *G06F 11/3476* (2013.01)

(58) Field of Classification Search
CPC ............... G06F 11/3476; G06F 11/079; G06F 11/3466; A63F 13/40; A63F 13/75; A63F 7/30; A63F 2007/308
See application file for complete search history.

(56) References Cited

U.S. PATENT DOCUMENTS 10,282,280 B1 * 5/2019 Gouskova ............... A63F 13/35
10,891,219 B1 * 1/2021 Dimitropoulos ...... A63F 13/352
(Continued)

FOREIGN PATENT DOCUMENTS

JP 6438612 B1 12/2018

OTHER PUBLICATIONS

"Cygames is developing AI system for automating game debugging", Retrieved from the Internet on Jul. 27, 2021; Retrieved from the Internet: URL:https://www.nikkan.co.jp/articles/view/00591096 (7 pages).

*Primary Examiner* — Jonathan D Gibson
(74) *Attorney, Agent, or Firm* — Osha Bergman Watanabe & Burton LLP (57) ABSTRACT

One or more embodiments of the invention is a method for estimating the cause of a problem from game log data in a game that proceeds in accordance with actions selected by users, whereby a game state is updated, the method including a step of determining, for a combination of an action preceding the occurrence of the problem and a prescribed game state element included in a game state relating to that action, the action and the game state element being included in one irregular-log-data array among irregular-log-data arrays, whether or not the combination is a cause of the occurrence of the problem on the basis of the degree of presence of the combination in the irregular-log-data arrays included in the game log data and the degree of presence of the same combination in regular-log-data arrays included in the game log data.

8 Claims, 3 Drawing Sheets

(51) Int. Cl.
    *G06F 11/07*     (2006.01)
    *G06F 11/34*     (2006.01)

(56) References Cited

U.S. PATENT DOCUMENTS

| | | |
|---|---|---|
| 11,331,580 B2 | 5/2022 | Kurabayashi |
| 11,874,764 B2 * | 1/2024 | Jang .................. G06N 20/00 |
| 2005/0288103 A1 * | 12/2005 | Konuma ............... A63F 13/12 |
| | | 463/42 |
| 2010/0190551 A1 * | 7/2010 | Iwakiri ................ A63F 13/497 |
| | | 463/31 |
| 2012/0209571 A1 * | 8/2012 | Peterson ............ G06F 11/3698 |
| | | 702/186 |
| 2016/0310850 A1 * | 10/2016 | Covington ............ G06Q 50/34 |
| 2020/0192788 A1 * | 6/2020 | Seo .................... G06F 11/3668 |
| 2021/0001231 A1 | 1/2021 | Kurabayashi |
| 2022/0032199 A1 * | 2/2022 | Rudi .................. G06N 20/00 |
| 2022/0197784 A1 * | 6/2022 | Jang .................. G06F 11/3688 |
| 2023/0014321 A1 * | 1/2023 | Nair .................. G10L 25/51 |
| 2023/0121618 A1 * | 4/2023 | Rudi .................. A63F 13/46 |
| | | 463/42 |
| 2024/0050858 A1 * | 2/2024 | Sestini ................ A63F 13/69 |
| 2024/0184660 A1 * | 6/2024 | Kurabayashi ........... A63F 13/70 |
| 2025/0041734 A1 * | 2/2025 | Takashima ............ A63F 13/422 |

\* cited by examiner

$$\begin{pmatrix} c_1 & c_2 & c_3 & & c_{2600} \\ 0 & 0 & 1 & & 0 \\ 0 & 0 & 1 & \cdots & 0 \\ 0 & 0 & 0 & & 0 \\ & \vdots & & \vdots & \\ 0 & 1 & 0 & & 0 \\ 0 & 0 & 0 & \cdots & 0 \\ 0 & 0 & 0 & & 0 \\ 0 & 1 & 0 & & 0 \end{pmatrix}$$

FIG.5

METHOD, PROGRAM, SYSTEM, AND DEVICE FOR ESTIMATING CAUSE OF PROBLEM

TECHNICAL FIELD

The present invention relates to methods, programs, systems, and devices for estimating the cause of a problem. In particular, the present invention relates to a method, a program, a system, and a device for estimating the cause of a problem from game log data.

BACKGROUND ART

Recently, an increasing number of players are enjoying online games in which a plurality of players can participate via a network. Such a game is realized, for example, by a game system in which mobile terminal devices carry out communication with a server device of a game service provider, and players who operate the mobile terminal devices can play battles with other players.

A game service provider, before providing a game, has to inspect the game program to detect bugs. Technologies for improving the efficiency of such inspection are generally called quality assurance (QA) technologies.

CITATION LIST

Patent Literature

[PTL 1]
Publication of Japanese Patent No. 6438612
[NPL 1]
"Cygames is developing AI system for automating game debugging", [online], [retrieved on 27 Jul. 2021], Internet, URL:https://www.nikkan.co.jp/articles/view/00591096

SUMMARY OF INVENTION

Technical Problem

An example of the type of games for which QA is performed is the type of card games called digital collectible card games (DCCGs), in which various actions are executed in accordance with combinations of cards, characters, or the like (hereinafter referred to as "card combinations"). An increase in the number of kinds of cards, while drastically improving the strategic intricacies of a game, also results in an explosive increase in the number of situations requiring verification. It has been extremely difficult to exhaustively verify such an explosively increasing number of card combinations through manual test plays, which requires a huge number of staff members and a huge amount of time. As a system concerning QA, for example, Patent Literature 1 discloses a system, etc. that make it possible to inspect a game program by inferring actions that are more likely to be executed by users. Furthermore, as a system concerning QA, for example, automation of game debugging by means of AI technology has been realized (Non-Patent Literature 1).

In this situation, since a game service provider can expect a further improvement in the efficiency of game service or game development if the causes of problems originating from combinatorial patterns in a game are identified, there has been demand for estimating the cause of such problems. The present invention has been made in order to solve the problem described above, and it is an object thereof to provide a method, etc. that make it possible to estimate the cause of a problem from game log data.

Solution to Problem

[1] A method in one embodiment of the present invention is the following method.

A method for estimating the cause of a problem from game log data in a game that proceeds in accordance with actions selected by users, whereby a game state is updated, the method being executed by a computer, the game state being configured to include a plurality of game state elements, the game log data including a plurality of log-data arrays, and a label indicating either regularity or irregularity being assigned to each of the log-data arrays, the method including:
  a step of determining, for a combination of an action preceding the occurrence of the problem and a prescribed game state element included in a game state relating to that action, the action and the game state element being included in one irregular-log-data array among irregular-log-data arrays, which are log-data arrays having assigned thereto labels indicating irregularity, whether or not the combination is a cause of the occurrence of the problem on the basis of the degree of presence of the combination in the irregular-log-data arrays included in the game log data and the degree of presence of the same combination in regular-log-data arrays included in the game log data, the regular-log-data arrays being log-data arrays having assigned thereto labels indicating regularity.

[2] One embodiment of the present invention is a method according to [1],
  wherein the determining step includes determining, for a combination of an action preceding the occurrence of the problem and a prescribed game state element included in a game state relating to that action, the action and the game state element being included in one irregular-log-data array, that the combination is a cause of the occurrence of the problem when the ratio of a value based on the degree of presence of the combination in irregular-log-data array included in the game log data to a value based on the degree of presence of the same combination in the regular-log-data array included in the game log data is greater than or equal to a prescribed value.

[3] A method in one embodiment of the present invention is a method according to [1] or [2], the method including:
  a step of assigning a label indicating either regularity or irregularity to each of the log-data arrays.

[4] A method in one embodiment of the present invention is a method according to any one of [1] to [3], the method including:
  a step of extracting a prescribed game state element from game state elements included in a game state relating to an action preceding the occurrence of the problem, the action being included in one irregular-log-data array,
  wherein the determining step includes determining, for a combination of the action preceding the occurrence of the problem and included in the one irregular-log-data array and the extracted prescribed game state element, whether or not the combination is a cause of the occurrence of the problem on the basis of the degree of presence of the combination in the irregular-log-data arrays included in the game log data and the degree of presence of the same combination in the regular-log-data arrays included in the game log data.

[5] A method in one embodiment of the present invention is a method according to any one of [1] to [4], wherein the determining step includes determining, for a combination of one action immediately preceding the occurrence of the problem and a prescribed game state element included in a game state immediately preceding the action, the action and the game state element being included in one irregular-log-data array, whether or not the combination is a cause of the occurrence of the problem on the basis of the degree of presence of the combination in the irregular-log-data arrays included in the game log data and the degree of presence of the same combination in the regular-log-data arrays included in the game log data.

[6] A method in one embodiment of the present invention is a method according to any one of [1] to [4], wherein the determining step includes determining, for a combination of two or more actions immediately preceding the occurrence of the problem and prescribed game state elements included in game states immediately preceding the individual two or more actions, the actions and the game state elements being included in one irregular-log-data array, whether or not the combination is a cause of the occurrence of the problem on the basis of the degree of presence of the combination in the irregular-log-data arrays included in the game log data and the degree of presence of the same combination in the regular-log-data arrays included in the game log data.

[7] A program in one embodiment of the present invention is a program for causing a computer to execute the steps of a method according to any one of [1] to [6].

[8] An estimating system in one embodiment of the present invention is an estimating system for estimating the cause of a problem from game log data in a game that proceeds in accordance with actions selected by users, whereby a game state is updated, the game state being configured to include a plurality of game state elements, the game log data including a plurality of log-data arrays, wherein the estimating system:
  assigns a label indicating either regularity or irregularity to each of the log-data arrays; and
  determines, for a combination of an action preceding the occurrence of the problem and a prescribed game state element included in a game state relating to that action, the action and the game state element being included in one irregular-log-data array among irregular-log-data arrays, which are log-data arrays having assigned thereto labels indicating irregularity, whether or not the combination is a cause of the occurrence of the problem on the basis of the degree of presence of the combination in the irregular-log-data arrays included in the game log data and the degree of presence of the same combination in regular-log-data arrays included in the game log data, the regular-log-data arrays being log-data arrays having assigned thereto labels indicating regularity.

[9] An estimating device in one embodiment of the present invention is an estimating device for estimating the cause of a problem from game log data in a game that proceeds in accordance with actions selected by users, whereby a game state is updated, the game state being configured to include a plurality of game state elements, the game log data including a plurality of log-data arrays, and a label indicating either regularity or irregularity being assigned to each of the log-data arrays, wherein the estimating device:
  determines, for a combination of an action preceding the occurrence of the problem and a prescribed game state element included in a game state relating to that action, the action and the game state element being included in one irregular-log-data array among irregular-log-data arrays, which are log-data arrays having assigned thereto labels indicating irregularity, whether or not the combination is a cause of the occurrence of the problem on the basis of the degree of presence of the combination in the irregular-log-data arrays included in the game log data and the degree of presence of the same combination in regular-log-data arrays included in the game log data, the regular-log-data arrays being log-data arrays having assigned thereto labels indicating regularity.

Advantageous Effects of Invention

The present invention makes it possible to estimate the cause of a problem from game log data.

DESCRIPTION OF EMBODIMENTS

An embodiment of the present invention will be described below with reference to the drawings. An estimating device 10 in the embodiment of the present invention is an estimating device for estimating the cause of a problem from game log data of a game that proceeds in accordance with actions selected by users (players), whereby the game state is updated. For example, the game mentioned above is a game in which when a user selects an action in a certain game state, the selected action (an attack, an event, or the like) is executed, whereby the game state is updated. For example, the game is a battle-type card game.

The estimating device 10 is an example estimating system for estimating the cause of a problem, configured to include one or more devices. For convenience of description, however, the estimating device 10 will be described as a single device in the following embodiment. In this embodiment, a game state or an action may mean game state data or action data.

The battle-type card game that is described in the context of this embodiment (the game in this embodiment) is provided by a game server configured to include one or more server devices, similarly to online games in general. The game server stores a game program, which is an application for the game, and is connected via a network to terminal devices of individual users who play the game. While each user is executing the game app installed in the terminal device, the terminal device carries out communication with the game server, and the game server provides a game service via the network. At this time, the game server stores game log data, which are log data concerning the game. The game log data include a plurality of log-data arrays (log-data element arrays), and each log-data array includes a plurality of log-data elements. For example, each log-data array represents the history of a single battle, and includes a plurality of log-data elements concerning the battle. Furthermore, for example, each log-data element is data representing an action executed by a user in one game state and data representing the one game state. Alternatively, each log-data array may be a log-data element set including a plurality of log-data elements relating to a prescribed event, a prescribed time, or the like other than a single battle. For example, the game log data are replay logs, the log-data arrays are replay-log element arrays, and the log-data elements are replay-log elements.

This embodiment employs a virtual environment in which the virtualization of all the elements constituting the game service is realized, including the clients (the terminal devices of the users), the game server, a database server, and a communication server; i.e., in which end-to-end virtualization is realized. By letting AI perform auto-plays in the virtual environment, it is possible to acquire the behavior of the game service as log data. This scheme makes it possible to readily implement labelling of replay logs. In one example, the virtual environment assigns a "regular" label to log data for the case where an auto-play was finished without any error being detected, while assigning an "irregular" label to log data for the case where an error was detected during an auto-play. This makes it possible to readily label replay logs. For convenience of description, however, the estimating device 10 in this embodiment will be described as having a function for assigning labels. Technologies concerning virtual environments are described, for example, in Japanese Unexamined Patent Application, Publication No. 2019-193702. However, the method of acquiring log data is not limited to the method described above.

The game in this embodiment proceeds while a user selects cards from a possessed card group constructed to include a plurality of cards and places those cards in a field (game field) 43, whereby various events are executed in accordance with combinations of the cards or classes. Furthermore, the game in this embodiment is a battle game in which a local user and another user battle against each other by each selecting cards from the possessed card group and placing those cards in the field 43, where the local user refers to the user himself or herself who operates a user terminal device, and the other user refers to a user who operates another user terminal device. In the game in this embodiment, each card 41 has card definition information including a card ID, the kind of card, and parameters such as hit points, attacking power, and an attribute, and each class has class definition information.

Figure 3:
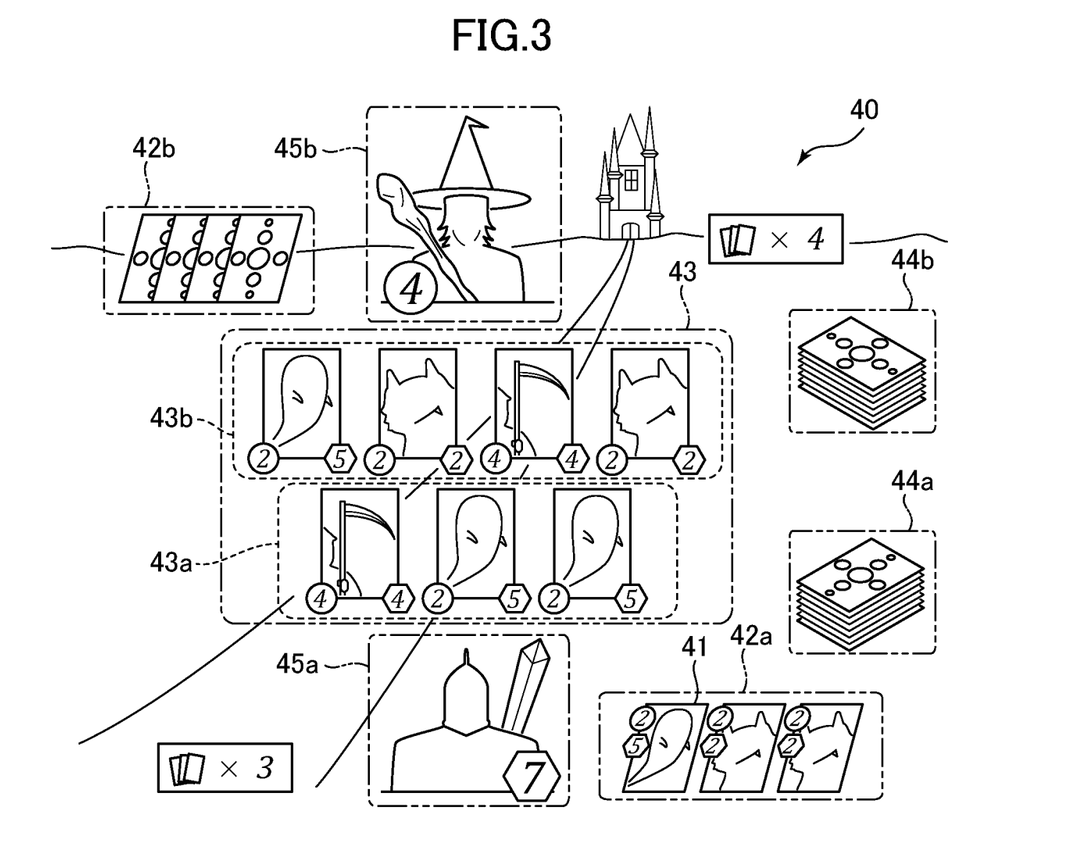
FIG. 3 shows an example game screen of a game in this embodiment, which is displayed on a display of a terminal device of a user.

FIG. 3 shows an example game screen of the game in this embodiment, which is displayed on the display of the terminal device of a user. The game screen shows a game screen 40 for a card battle between a local user and another user. The game screen 40 shows the hand 42a of the local user and the hand 42b of the other user. The hand 42a and the hand 42b include cards 41 associated with characters, items, or spells. The game is configured so that the local user cannot recognize the cards 41 in the hand 42b of the other user. The game screen 40 also shows the stock 44a of the local user and the stock 44b of the other user. Note that for the local user or the other user, operations may be performed by a computer, such as a game AI, instead of the real player.

The possessed card group possessed by each user is constituted of the hand 42 (42a or 42b) of the user and the stock 44 (44a or 44b) of the user, and is generally referred to as a card deck. Whether each card 41 possessed by the user is included in the hand 42 or the stock 44 is determined in accordance with the proceeding of the game. The hand 42 is a group of cards that can be selected and placed in the field 43 by the user, and the stock 44 is a group of cards that cannot be selected by the user. Although the possessed card group is constituted of a plurality of cards 41, depending on the proceeding of the game, there are cases where the possessed card group is constituted of a single card 41. Note that the card deck of each user may be constituted of cards 41 of all different kinds, or may be constituted to include some cards 41 of the same kind. Furthermore, the kinds of cards 41 constituting the card deck of the local user may be different from the kinds of cards 41 constituting the card deck of the other user. Furthermore, the possessed card group possessed by each user may be constituted of only the hand 42.

The game screen 40 shows a character 45a selected by the local user and a character 45b selected by the other user. The characters 45a and 45b that are selected by the users are different from characters associated with cards, and define classes indicating the types of the possessed card groups. The game in this embodiment is configured such that the cards 41 possessed by users vary depending on classes. In one example, the game in this embodiment is configured such that the kinds of cards that may constitute the card decks of individual users vary depending on classes. Alternatively, however, classes need not be included in the game in this embodiment. In this case, the game in this embodiment may be configured such that class-based limitations such as the above are not dictated and such that the game screen 40 does not display the character 45a selected by the local user or the character 45b selected by the other user.

As details of the game in this embodiment, a game having the following features is assumed.

The game is a battle game in which each battle (card battle) includes a plurality of turns.

A card deck is constituted of forty cards 41, and the total number of the cards 41 in the hand 42 and the stock 44 of each user at the start of a battle is forty.

The local user or the other user can attack a card 41 or a character 45 of the opponent or can generate a prescribed effect or event by performing an operation such as selecting one of his or her own cards 41 in each turn.

Each card 41 is present in one of the following places: the hand 42a of user 1, the hand 42b of user 2, the stock 44a of user 1, the stock 44b of user 2, the field 43, a graveyard, vanishment, extended place A, extended place B, and absence.

When one card 41 is placed into the field 43 from the hand 42 of one user, the number of cards in the hand 42 of the one user decreases by one, and the number of cards in the field 43 increases by one.

As a result of another card 41 being placed into the field 43, a card 41 placed into the field vanishes, is disposed in the graveyard, or is disposed in another extended place.

The cards 41 include cards whose effects are invoked to generate new cards when the cards are placed into the field 43 from a hand 42, and the generated cards (token cards) are cards that are not included in the cards 41 in the hands 42, or the stocks 44 of the individual users when a battle is started.

Although it depends on the cards 41 constituting a card deck, it is often the case that the number of token cards is about twenty.

A card 41 in a hand 42 or a stock 44 may experience a state change, such as effect enhancement.

There are cases where a card 41 in a hand 42 is fused with another card 41.

There are cases where a card 41 disposed in the graveyard is returned to the field 43 or is disposed in the absence.

A card 41 placed into the field 43 has an additional state, such as an evolution or a state change.

The replay logs can be configured to exhaustively include histories of information such as the information described above. The above-described game in this embodiment is an example, and there is no limitation thereto. The game that is subject to the estimating device 10 in this embodiment is the type of game in which the outcome is determined as a result of a prescribed number of cards being moved among prescribed places while involving state changes.

Figure 1:
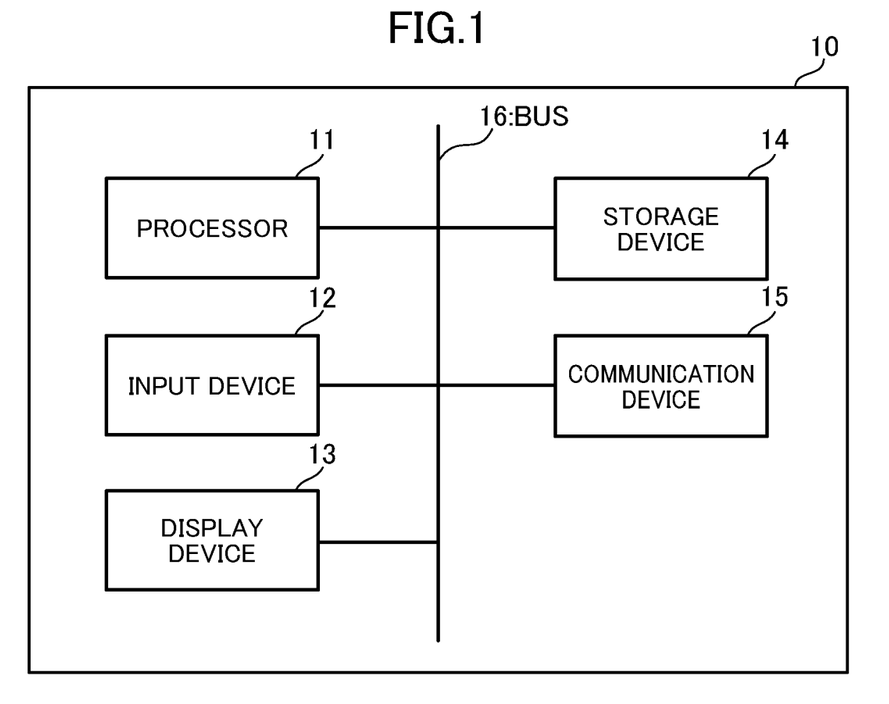
FIG. 1 is a block diagram showing the hardware configuration of an estimating device in one embodiment of the present invention.

FIG. 1 is a block diagram showing the hardware configuration of the estimating device 10 in one embodiment of the present invention. The estimating device 10 includes a processor 11, an input device 12, a display device 13, a storage device 14, and a communication device 15. These individual constituent devices are connected via a bus 16. Note that interfaces are interposed as needed between the bus 16 and the individual constituent devices. The estimating device 10 includes a configuration similar to that of an ordinary server, PC, or the like.

The processor 11 controls the operation of the estimating device 10 as a whole. For example, the processor 11 is a CPU. The processor 11 executes various kinds of processing by loading programs and data stored in the storage device 14 and executing the programs. The processor 11 may be constituted of a plurality of processors.

The input device 12 is a user interface that accepts inputs to the estimating device 10 from a user; for example, the input device 12 is a touch panel, a touchpad, a keyboard, a mouse, or buttons. The display device 13 is a display that displays application screens, etc. to the user of the estimating device 10 under the control of the processor 11.

The storage device 14 includes a main storage device and an auxiliary storage device. The main storage device is a semiconductor memory, such as a RAM. The RAM is a volatile storage medium that allows high-speed reading and writing of information, and is used as a storage area and a work area when the processor 11 processes information. The main storage device may include a ROM, which is a read-only, non-volatile storage medium. The auxiliary storage device stores various programs as well as data that is used by the processor 11 when executing the individual programs. The auxiliary storage device may be any type of non-volatile storage or non-volatile memory that is capable of storing information, which may be of the removable type.

The communication device 15 is a module, device, or apparatus that is capable of sending data to and receiving data from other computers, such as user terminals and servers, via a network. The communication device 15 may be a wireless communication device, module, or the like, or may be a wired communication device, module, or the like.

The estimating device 10 is configured to be able to acquire replay logs from a game server, where the replay logs refer to log data concerning the game. The replay logs are configured to include a plurality of replay-log element arrays, which are per-battle log data. The replay logs include game state data and action data. For example, each of the replay-log element arrays includes data of game states and data of actions, arranged along the elapse of time. In this case, each of the items of the data of game states and the data of actions is a replay log element. In one example, a replay-log element array includes a card 41 selected by each user, as well as information concerning an attack associated therewith, on a per-turn and per-user basis. In one example, a replay-log element array includes a card 41 selected by each user, as well as information concerning a generated prescribed effect or event associated therewith, on a per-turn and per-user basis. Alternatively, a replay-log element array may be log data per predefined unit other than single battle.

Game state data include data concerning the cards 41 that are present in all the places in the game (e.g., the hand 42*a* of user 1, the hand 42*b* of user 2, the stock 44*a* of user 1, the stock 44*b* of user 2, the field 43, a graveyard, vanishment, driving, fusing materials, and absence). Each item of game state data is data corresponding to the game state at each timing depending on the proceeding of the game. However, game states are not limited to the above as long as game states refer to information that can be visually or otherwise recognized by a user via a game play, for example, via game operations or what are displayed on the game screen.

An action is executed in response to a user operation in a certain game state, and may change that game state. For example, an action is an attack by one card 41 or character 45 on another card 41 or character 45, the generation of a prescribed effect or event by one card 41 or character 45, or the like. For example, an action is executed in response to a user selecting a card 41 or the like. Each item of action data is data corresponding to an action selected by a user in each game state. In one example, action data includes data indicating that a user has selected a card 41 for performing an attack therewith and a card 41 to be attacked in one game state. In one example, action data includes data indicating that a user has selected a card 41 to use in one game state.

In this embodiment, a replay log is defined in terms of a sequence of game state data and action data, where the game state data indicate the states of the field 43 in the form of tree-structured text data, and the action data indicate actions executed by users in those game states. Each replay-log element array $Replaylog_n$ is an array including the pair of an initial game state and the first action, as well as the pairs of game states resulting from being affected by actions and the next actions, and terminated with a final game state in which the outcome was finally determined or terminated with a final game state in which an error that prohibits proceeding occurred, and can be expressed by formula (1).

$$Replaylog_n := [State_0, Action_o, State_1, Action_1 \ldots, State_e] \quad (1)$$

Here, $Replaylog_n$ signifies the n-th replay-log element array, $State_i$ signifies the i-th game state, $Action_i$ signifies the i-th action executed, and $State_e$ signifies the final game state, such as a victory or defeat, a draw, or a no contest. In order to explicitly express $State_i$ and $Action_i$ of the n-th replay-log element array $Replaylog_n$, formula (1) can also be expressed by the formula given below.

$$Replaylog_n := [State_0^n, Action_0^n, State_1^n, Action_1^n, \ldots, State_e^n] State_0^n$$

In the following description, superscripts such as n in the above expression is given as characters corresponding to identification numbers or identifiers for identifying replay logs unless otherwise specifically mentioned.

In one example, $State_i$, indicating the state in one scene in the game, signifies the set of the cards 41 that are present in all the places in the game, and can be expressed by a vector $Sv_i$ (state vector) expressed in formula (2).

$$Sv_i := [card_1, card_2, card_3, \ldots card_k] \quad (2)$$

Here, $card_1$ to $card_k$ signify card elements representing individual cards, in which the states of the cards are encoded as card.state in the IDs of the cards. As expressed in formula (2), $Sv_i$ is expressed as a k-dimensional vector. The total number of cards 41 in the hand 42 and the stock 44 of the two users at the start of a battle is eighty, and the number of token cards that are generated while the game proceeds is about twenty, and thus k is about one hundred. Although this embodiment will be described below in the context of k=100 for convenience of description, the value of k is not limited to this value. Furthermore, in this embodiment, $card_1$ to $card_k$ signify k kinds of cards.

In this embodiment, there are 26 card states, which are shown in Table 1, and each of $card_1$ to $card_k$ has twenty-six IDs. As described above, the cards are configured such that cards in different states have different identifiers.

TABLE 1

| | |
|---|---|
| 1. | Stock 1 |
| 2. | Stock 1, with a state change |
| 3. | Stock 2 |
| 4. | Stock 2, with a state change |
| 5. | Hand 1 |
| 6. | Hand 1, with a state change |
| 7. | Hand 2 |
| 8. | Hand 2, with a state change |
| 9. | Field 1 |
| 10. | Field 1, evolved |
| 11. | Field 1, with a state change |
| 12. | Field 1, evolved, and with a state change |
| 13. | Field 2 |
| 14. | Field 2, evolved |
| 15. | Field 2, with a state change |
| 16. | Field 2, evolved, and with a state change |
| 17. | Graveyard 1 |
| 18. | Graveyard 2 |
| 19. | Vanishment 1 |
| 20. | Vanishment 2 |
| 21. | Extended place A1 |
| 22. | Extended place A2 |
| 23. | Extended place B1 |
| 24. | Extended place B2 |
| 25. | Absence |
| 26.. | Absence |

By using $State_i$ in which card.state is used, as described above, it is possible to encode the state in a specific scene of the game in the form of a k-dimensional numerical vector. Furthermore, since the number of dimensions of this vector does not change within a single battle, it is possible to create a matrix model for an array of state vectors. Therefore, it is possible to create a model of a replay-log element array ($replaylog_n$) in the form of a single matrix $ReplaylogMatrix_n$, as expressed in formula (3).

$$ReplaylogMatrix_n \rightarrow \begin{bmatrix} Sv_0^n \\ Sv_1^n \\ \vdots \\ Sv_e^n \end{bmatrix} \qquad (3)$$

In one example, when there are two thousand kinds of cards in the game, a state vector is a two-thousand-dimensional vector of $card_j$ (j=1 to 2000). In this case, it is possible to represent the state of one scene in the game in the form of a combination of 52,000 (=2000×26) IDs. Note that in this case, there are many kinds of cards that do not appear in one battle (replay-log element array), and the cards that do not appear are in none of the twenty-six states shown in Table 1 and thus do not have any of the IDs shown in Table 1.

Figure 2:
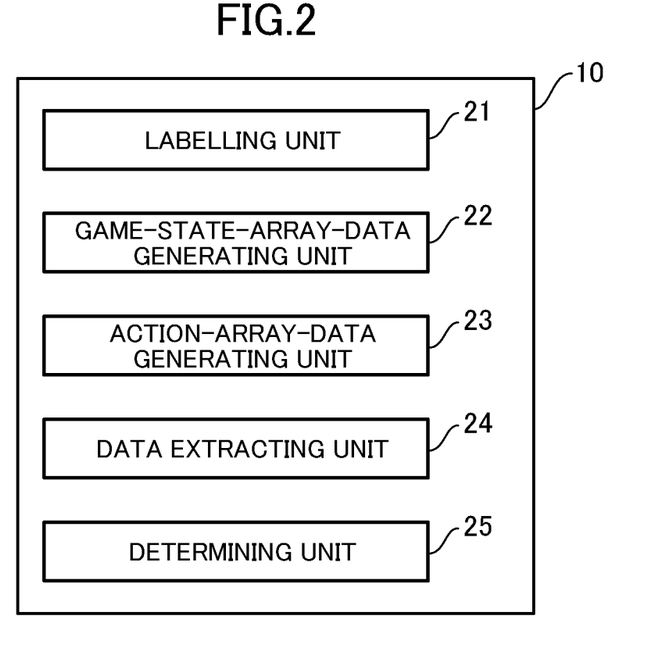
FIG. 2 is a functional block diagram of the estimating device in one embodiment of the present invention.

FIG. 2 is a functional block diagram of the estimating device 10 in one embodiment of the present invention. The estimating device 10 includes a labelling unit 21, a game-state-array-data generating unit 22, an action-array-data generating unit 23, a data extracting unit 24, and a determining unit 25. In this embodiment, these functions are realized by the processor 11 executing programs stored in the storage device 14 or received via the communication device 15. Since various functions are realized by loading programs, as described above, a portion or the entirety of one part (function) may be provided in another part. Alternatively, however, these functions may be realized by means of hardware by configuring electronic circuits or the like for realizing the individual functions in part or in entirety.

The labelling unit 21 assigns labels indicating either regularity or irregularity to the individual replay-log element arrays included in replay logs. The labelling unit 21 assigns labels indicating regularity to replay-log element arrays for regularly finished plays, while assigning labels indicating irregularity to replay-log element arrays for irregularly terminated plays. In this way, replay-log element arrays included in replay logs are classified into a set R of regular-log-data arrays (regular-log-data element arrays), which are replay-log element arrays having assigned thereto labels indicating regularity, and a set I of irregular-log-data arrays (irregular-log-data element arrays), which are replay-log element arrays having assigned thereto labels indicating irregularity. In this embodiment, a virtual system in which virtualization of all the elements constituting the game service is realized can acquire the behavior of the game service as log data. In one example, the virtual system executes not less than 100,000 battles, and exhaustively saves the results of the battles, client-side error logs, server-side error logs, snapshots of replay logs, etc. Note that assigning a label may mean a function equivalent to, for example, setting a flag.

In one example, the labelling unit 21 is realized by using a label function expressed in formula (4).

$$\text{label}(cslog_i) \rightarrow [Regular | Irregular] \qquad (4)$$

The label function refers to cslog_i, which is client-side or server-side log data corresponding to the i-th $Replaylog_i$. cslog_i is a log stored in association with $Replaylog_i$ in the game server and the client that executes the game. The label function returns a Regular label in the case where $Replaylog_i$ is for a regularly finished play, while returning an Irregular label in the case where $Replaylog_i$ is for an irregularly terminated play, i.e., in the case where a problem occurred.

The label function can be implemented just with character string matching within log data. For example, in the case of a no contest, since a character string "NO CONTEST" is recorded in a server-side error log, the label function can determine whether or not a problem occurred by searching for this character string. For example, in the case of a client-side error, the label function can determine whether or not a problem occurred by searching for a match with a prescribed error character sequence that is output to a stack trace, like "NullPointerException".

The game-state-array-data generating unit 22 generates game-state array data ($ReplaylogMatrix_n$) in which data of game states are arrayed in order of time from one replay-log element array. The game-state-array-data generating unit 22 generates game-state array data for each of the replay-log element arrays included in the set R and each of the replay-log element arrays included in the set I. In one example, game-state array data is associated with the replay-log element array from which the game-state array data was generated.

In one example, the game-state-array-data generating unit 22 is realized by using an encode_state function expressed in formula (5).

$$\text{encode\_state}(\text{replaylog}_n) \rightarrow \begin{bmatrix} Sv_0^n \\ Sv_1^n \\ \vdots \\ Sv_e^n \end{bmatrix} \quad (5)$$

The encode_state function converts all the game states included in a replay-log element array $\text{Replaylog}_n$ into state vectors expressed in formula (2), and converts the state vectors into $\text{ReplaylogMatrix}_n$ expressed in formula (3). $\text{ReplaylogMatrix}_n$ is an array of state vectors.

$Sv_i^n$

The i-th state vector, expressed above, is a vector corresponding to the game state after i changes from the initial game state in the replay-log element array. Each of the state vectors has exhaustively recorded therein the states of the one hundred cards that are handled in the game.

Figure 4:
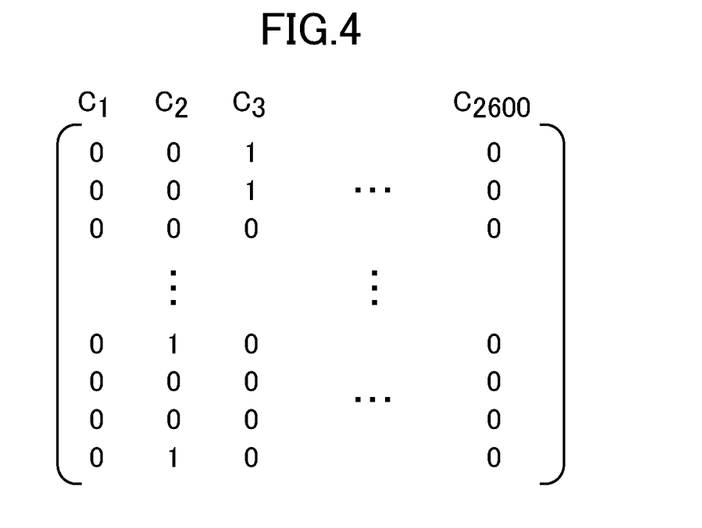
FIG. 4 is an illustration showing an example of Replay-logMatrix$_n$.

FIG. 4 is a figure showing an example of $\text{ReplaylogMatrix}_n$. Row elements $c_1$ to $c_{2600}$ represent the twenty-six states of the individual cards $\text{card}_1$ to $\text{card}_{100}$; for example, $c_1$ to $c_{26}$ represent the twenty-six states of $\text{card}_1$. Column elements individually correspond to state vectors, the first row corresponding to $Sv_0$, the last row corresponding to $Sv_e$, and arrayed in order of time from top to bottom. In each element of the matrix, either "0" or "1" is stored; "1" is stored when the card state is included in the game state at that timing, and "0" is stored otherwise.

The action-array-data generating unit 23 generates action array data in which data of actions are arrayed in order of time from one replay-log element array. The action-array-data generating unit 23 generates action array data Raction for each of the replay-log element array included in the set R, and generates action array data Iaction for each of the replay-log element array included in the set I. In one example, action array data is associated with the replay-log element array from which the action array data was generated.

In one example, the action-array-data generating unit 23 is realized by using an encode_action function expressed in formula (6).

$$\text{encode\_action}(\text{replaylog}_n) \rightarrow [\text{Action}_0^n, \text{Action}_1^n \ldots, \text{Action}_p^n] \quad (6)$$

The encode_action function receives a replay-log element array, and generates Raction or Iaction action array data in which data of actions included in the replay-log element array are extracted.

$\text{Action}_0^n$ signifies the first action in $\text{Replaylog}_n$, $\text{Action}_p^n$ signifies the last action in $\text{Replaylog}_n$. Models for action array data Raction generated from the α-th $\text{Replaylog}_\alpha$ included in the set R and action array data Iaction generated from the β-th $\text{Replaylog}_\beta$ included in the set I are expressed in formula (7) and formula (8).

$$\text{Raction}_\alpha := [\text{Action}_0^\alpha, \text{Action}_1^\alpha \ldots, \text{Action}_p^\alpha] \quad (7)$$

$$\text{Iaction}_\beta := [\text{Action}_0^\beta, \text{Action}_1^\beta \ldots, \text{Action}_p^\beta] \quad (8)$$

The data extracting unit 24 extracts prescribed card elements from the card elements included in game states relating to actions preceding the occurrence of a problem, included in one irregular-log-data array. The prescribed card elements are at least some of the card elements included in game states. In one example, the data extracting unit 24, from each irregular-log-data array with which the cause of a problem is to be estimated, extracts the prescribed card elements from the card elements included in game states relating to actions preceding the occurrence of a problem, included in an irregular-log-data array. In this embodiment, the data extracting unit 24 extracts the prescribed card elements from the card elements included in one game state immediately preceding an action immediately preceding the occurrence of a problem, included in one irregular-log-data array.

In one example, the data extracting unit 24 is realized by using a combination function expressed in formula (9).

$$\text{combination}(\text{state}_k) := [\text{card}_0, \text{card}_2, \ldots \text{card}_q] \quad (9)$$

The combination function extracts (outputs) a combination of w card elements ($\text{card}_0$, $\text{card}_2$, ..., $\text{card}_q$) from a state vector representing one game state. By using the combination function, the data extracting unit 24 extracts a combination of w card elements from the card elements included in one game state (state vector) immediately preceding an action immediately preceding the occurrence of a problem, included in one irregular-log-data array. These w card elements are the prescribed card elements, which are referred to as S. The card elements S may be predetermined w ($1 \leq w \leq k$) card elements, or may be w card elements extracted in accordance with a game state according to rules that have been set. Note that in formula (9), the notation $\text{card}_0$, $\text{card}_2$, ... $\text{card}_q$ is an example, and there is no limitation thereto. In one example, the data extracting unit 24 recognizes an action immediately preceding the occurrence of a problem on the basis of action array data Iaction, acquires the state vector of the one game state immediately preceding the action, and extracts and outputs the card elements S included in the game state.

The determining unit 25, for a combination of an action preceding the occurrence of a problem and a prescribed card element included in a game state relating to that action, the action and the prescribed card element being included in one irregular-log-data array with which the cause of the problem is to be estimated, determines whether or not the combination is a cause of the occurrence of the problem on the basis of the degree of presence (inclusion) of the combination in the irregular-log-data arrays included in the replay logs and the degree of presence (inclusion) of the same combination in the regular-log-data arrays included in the replay logs. In one example, for a combination of an action preceding the occurrence of a problem and a prescribed card element included in a game state relating to that action, the action and the prescribed card element being included in one irregular-log-data array, the determining unit 25 determines that the combination is a cause of the occurrence of the problem when the ratio of a value based on the degree of presence of the combination in the irregular-log-data arrays included in the replay logs to a value based on the degree of presence of the same combination in the regular-log-data arrays included in the replay logs is greater than or equal to a prescribed value. In this embodiment, for a combination of one action immediately preceding the occurrence of a problem and a prescribed card element included in one game state immediately preceding that action, the action and the game state element being included in one irregular-log-data array, the determining unit 25 determines whether or not the combination is a cause of the occurrence of the problem on the basis of the degree of presence of the combination in the irregular-log-data arrays included in the replay logs and the degree of presence of the same combination in the regular-log-data arrays included in the replay logs.

In one example, the determining unit 25 is realized by using an association rule learning function (SimulatedConfidence function) expressed in formula (10).

$$\text{SimulatedConfidence} = \frac{freq(A_p, S_p \mid S_p \in I)}{freq(A_p, S'_p \mid S'_p \in R)} \quad (10)$$

Here, $A_p$ signifies an action immediately preceding the occurrence of a problem for which the cause is to be estimated, $S_p$ signifies a card element S included in the game state immediately preceding $A_p$, freq($A_p$, $S_p|S_p \in I$) signifies the frequency of presence (occurrence) of a game state including $S_p$ and $A_p$ in this order (order of time) in the irregular-log-data arrays included in the replay logs. In other words, freq($A_p$, $S_p|S_p \in I$) indicates the frequency of cooccurrence between A and S in the irregular-log-data arrays included in the replay logs. $S'_p$ signifies the same card element S as $S_p$, included in the regular-log-data arrays, and freq($A_p$, $S'_p|S'_p \in I$) signifies the frequency of presence (occurrence) of a game state including $S'_p$ and $A_p$ in this order (order of time) in the regular-log-data arrays included in the replay logs. The association rule learning function indicates the level of correlation concerning the occurrence of a problem between the action $A_p$ immediately preceding the occurrence of the problem and the card element $S_p$ included in the immediately preceding game state. The determining unit 25 identifies pairs of $A_p$ and $S_p$ with which the value output by the association rule learning function exceeds a threshold t, as "cause elements resulting in a problem". In the case where the association rule learning function is implemented, the determining unit 25 first calculates freq($A_p$, $S_p|S_p \in I$), and uses the function to calculate freq($A_p$, $S'_p|S'_p \in I$) for the pairs of $A_p$ and $S_p$ ($S_p$') with which the calculated value exceeds the threshold it. Note that in formula (10), a prescribed value, such as 1, may be added to the denominator in order to prevent division by zero. Alternatively, the output value of the correlation may be adjusted by adding a prescribed value to or subtracting a prescribed value from the numerator or the denominator.

In one example, in calculating freq($A_p$, $S_p|S_p \in I$), the determining unit 25 extracts the same action $A_i$ as the action $A_p$ from Iaction, and calculates the number of irregular-log-data arrays including the same card element as $S_p$ in the game state immediately preceding the action $A_i$, extracted with reference to the state vector. In this case, in calculating freq($A_p$, $S'_p|S'_p \in I$), the determining unit 25 extracts the same action $A_i$ as the action $A_p$ from Raction, and calculates the number of regular-log-data arrays including the same card element as $S_p$ ($S'_p$) in the game state immediately preceding the action $A_i$, extracted with reference to the state vector.

Figure 5:
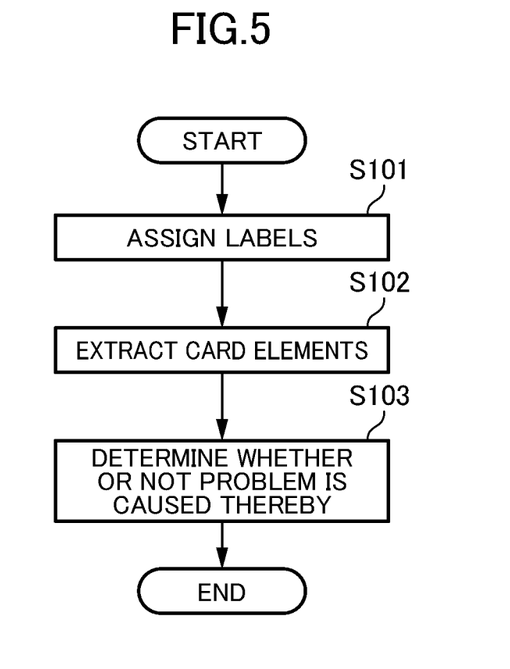
FIG. 5 is a flowchart showing an estimation process by the estimating device in one embodiment of the present invention.

Next, an estimation process by the estimating device 10 in one embodiment of the present invention will be described with reference to a flowchart shown in FIG. 5.

In step 101, the labelling unit 21 assigns labels indicating either regularity or irregularity to the individual replay-log element arrays included in the replay logs.

In step 102, the data extracting unit 24 extracts a prescribed card element from the card elements included in a game state relating to an action preceding the occurrence of a problem, included in one irregular-log-data array with which the cause of the problem is to be estimated.

In step 103, for a combination of an action preceding the occurrence of the problem and the prescribed card element included in the game state relating to that action, the action and the prescribed card element being included in the one irregular-log-data array with which the cause of the problem is to be estimated, the determining unit 25 determines whether or not the combination is a cause of the occurrence of the problem on the basis of the degree of presence of the combination in the irregular-log-data arrays included in the replay logs and the degree of presence of the same combination in the regular-log-data arrays included in the replay logs.

Next, main operations and advantages of the estimating device 10 in the embodiment of the present invention will be described.

In this embodiment, the entire service constituting the game is virtualized end to end, and it is possible to acquire the behavior of the game service as log data from the virtual environment. This scheme makes it possible to readily implement the assignment of labels indicating either regularity or irregularity to individual replay-log element arrays. Furthermore, in this embodiment, for a combination of an action preceding the occurrence of a problem and a prescribed card element included in a game state relating to that action, the action and the prescribed card element being included in one irregular-log-data array with which the cause of the problem is to be estimated, the determining unit 25 determines whether or not the combination is a cause of the occurrence of the problem on the basis of the degree of presence of the combination in the irregular-log-data arrays included in the replay logs and the degree of presence of the same combination in the regular-log-data arrays included in the replay logs.

Regarding the estimation of the cause of a problem, there have hitherto been an approach in which program analyzing technology is employed and an approach in which data mining technology is applied to bug reports. With these approaches, however, it has not been possible to exhaustively detect game-specific problems such as no contests in PVP games and data or behavior inconsistency between a client and a server. With recent games in particular, rather than program code itself, data that is used in the games are playing increasing roles, and problems originating from data, which cannot be detected with existing technologies, are frequently occurring.

The configuration of this embodiment makes it possible to automatically discover (estimate) the cause of a problem originating from a combinatorial pattern in a game from game logs, for which manual analysis has been required in order to clarify the cause. This makes it possible to realize further improvement in the efficiency of game service and game development.

Furthermore, a great advantage of the estimating device 10 in this embodiment is that the estimating device 10 makes it possible to transform a huge amount of regular replay logs, which has been stored in vain, into information resources that can be applied to association rule learning (the calculation of the association rule learning function in this embodiment) in data mining. No method like the method of this embodiment has been proposed, in which the entire service constituting a game is virtualized end to end, and data mining is applied to all log data that can be acquired from the virtual environment. By utilizing replay logs based on such a virtual environment, it becomes possible to further improve the efficiency of debugging.

Furthermore, the estimation method in this embodiment is widely applicable to turn-based battle games, which makes it possible to expand debugging by means of AI that simulates human playing tendencies to a variety of genres. Furthermore, the method of estimating a problem in this embodiment is a method that is applicable to the case where replay logs are continuously expanded, and thus is suitable for game titles that will be run on a long-term basis. Furthermore, in this embodiment, since auto-plays are performed by AI, it becomes possible to estimate the cause of a problem from game log data even with new cards that have been newly released. Furthermore, the association rule learning in this embodiment is an algorithm having extremely high versatility, and does not depend on any specific game genre or any specific data. Therefore, it is possible to automatically increase or decrease the number of dimensions of the replay log matrix, which makes it possible to reduce maintenance costs.

The above operations and advantages also apply to other embodiments and other modifications unless otherwise specifically mentioned.

Another embodiment of the present invention may be a program for realizing the functions or the information processing shown in the flowchart in the above-described embodiment of the present invention, or a computer-readable storage medium storing the program. Alternatively, another embodiment of the present invention may be a method for realizing the functions or the information processing shown in the flowchart in the above-described embodiment of the present invention. Alternatively, another embodiment of the present invention may be a server that is capable of providing a computer with a program for realizing the functions or the information processing shown in the flowchart in the above-described embodiment of the present invention. Furthermore, another embodiment of the present invention may be a virtual machine or a cloud system for realizing the functions or the information processing shown in the flowcharts in the above-described embodiment of the present invention.

In an embodiment of the present invention, the cards 41 (a card group) may be media (a medium group) such as characters or items, and a possessed card group may be a possessed medium group configured to include a plurality of media possessed by a user. For example, in the case where a medium group is constituted of media including characters and items, the game screen 40 shows characters or items themselves as the cards 41. Similarly, card elements may be game state elements that are medium element not limited to cards.

In an embodiment of the present invention, the number of card states of the individual card elements is not limited to twenty-six, and may be an arbitrary number. For example, regarding the card states, each of $card_1$ to $card_k$ has thirty IDs, and in the case where k=10,000 in formula (2), the column elements of $ReplaylogMatrix_n$ shown in FIG. 4 are 300,000 elements $C_1$ to $C_{300000}$. Furthermore, the method of specifying the information concerning the card states of the card elements is not limited to the method in this embodiment as long as it is possible to distinguish the card states of the card elements.

In one or more embodiments of the present invention, $card_1$ to $card_k$ expressed in formula (2) signify k kinds of cards; however, at least some of the k kinds of cards may be the same card. In this embodiment, the game-state-array-data generating unit 22 is configured to store either "0" or "1" in each matrix element of $ReplaylogMatrix_n$ in accordance with the card state included in the game state at the corresponding timing.

In one or more embodiments of the present invention, $card_1$ to $card_k$ expressed in formula (2) may signify k kinds of cards of all different kinds. In this embodiment, the game-state-array-data generating unit 22 can store numerical values or information other than "0" or "1" in the matrix elements of $ReplaylogMatrix_n$. For example, the game-state-array-data generating unit 22 is configured to store the number of cards (e.g., "3") or information corresponding to the number in the corresponding matrix element of $ReplaylogMatrix_n$ in the case where a plurality of cards (e.g., three cards) of the same kind having the same card state (card-.state) in a certain game state are present (e.g., in the case where a plurality of cards of the same kind are present in the hand of a user in a certain game state).

In an embodiment of the present invention, it is possible to virtualize a game service end to end and to acquire the behavior of the game service as log data from the virtual environment. In the virtual environment, since the game is executed in a headless mode in order to increase the speed of processing, a client need not be provided with a display. The game screen shown in FIG. 3 is an example for explaining the content of the game, and there is no need to actually display the game screen on a display.

In an embodiment of the present invention, a system other than the estimating device 10, such as the virtual environment in which the game service is virtualized end to end, may be provided with the function of the labelling unit 21. In this case, the estimating device 10 need not be provided with the function of the labelling unit 21. In this embodiment, the estimating device 10 is configured to be able to receive replay logs having assigned thereto labels indicating either regularity or irregularity from the other system (virtual environment). In this embodiment, the flowchart shown in FIG. 5 need not include step 101.

In a modification of the present invention, the data extracting unit 24 extracts prescribed card elements individually from the card elements individually included in the game states immediately preceding the individual M actions (M≥2) immediately preceding the occurrence of a problem, included in one irregular-log data array.

In this modification, for example, in the case where M=2, the data extracting unit 24 is realized by using a combination function expressed in formula (11), instead of the combination function expressed in formula (9).

$$\text{combination}(state_{k-1}, state_k) := \quad (11)$$

$$\{[card_0, card_2, \cdots card_q], [card_0, card_2, card_q]\}$$

The combination function individually extracts (outputs) combinations of w card elements ($card_0$, $card_2$, ..., $card_q$) from individual two state vectors that are adjacent in the game-state array data. The data extracting unit 24, by using the combination function, individually extracts combinations of w card elements from the card elements included in the individual game states immediately preceding the two actions immediately preceding the occurrence of a problem, included in one irregular-log-data array. Each of the two combinations of w card elements is prescribed card elements, and is referred to as S. The w card elements may be predetermined w (1≤w≤k) card elements, or may be w card elements extracted in accordance with game states according to rules that have been set. Note that in formula (9), the notation $card_0$, $card_2$, ... $card_q$ is an example, and there is no limitation thereto. For example, the data extracting unit 24 recognizes the two actions immediately preceding the occurrence of a problem on the basis of the action array data Iaction, individually acquires the state vectors of the game states immediately preceding the individual actions, and individually extracts and outputs the card elements S included in the individual game states.

In this modification, for a combination of two or more actions immediately preceding the occurrence of a problem and prescribed card elements included in the individual game states immediately preceding the individual two or more actions, the actions and the prescribed card elements being included in one irregular-log-data array, the determining unit 25 determines whether or not the combination is a cause of the occurrence of the problem on the basis of the degree of presence of the combination in the irregular-log-data arrays included in the replay logs and the degree of presence of the same combination in the regular-log-data arrays included in the replay logs.

In this modification, for example, in the case where M=2, the determining unit 25 is realized by using an association rule learning function (SimulatedConfidence function) expressed in formula (12).

$$\text{SimulatedConfidence} = \frac{freq(A_{p-1}, A_p, S_{p-1}, S_p | S_{p-1}, S_p \in I)}{freq(A_{p-1}, A_p, S'_{p-1}, S'_p | S'_{p-1}, S'_p \in R)} \quad (12)$$

$A_{p-1}$ and $A_p$ signify the two actions immediately preceding the occurrence of a problem for which the cause is to be estimated, and $S_{p-1}$ and $S_p$ signify the w card elements (card elements S) included in the game states immediately preceding $A_{p-1}$ and $A_p$, respectively. $freq(A_{p-1}, A_p, S_{p-1}, S_p | S_p \in I)$ signifies the frequency of presence (occurrence) of a game state including $S_{p-1}, A_{p-1}$, a game state including $S_p$, and $A_p$ in this order (order of time) in the irregular-log-data arrays included in the replay logs. $S'_p$ and $S'_{p-1}$ respectively signify the same card elements S as $S_{p-1}$ and $S_p$ included in the regular-log-data arrays. $freq(A_{p-1}, A_p, S'_{p-1}, S'_p | S'_p \in I)$ signifies the frequency of presence (occurrence) of a game state including $S'_{p-1}, A_{p-1}$, a game state including $S'_p$, and $A_p$ in this order (order of time) in the regular-log-data arrays included in the replay logs. The determining unit 25 identifies the combinations of $A_{p-1}, A_p, S_{p-1}$, and $S_p$ with which the value output by the association rule learning function exceeds a threshold t as "cause element resulting in a problem". In the case where the association rule learning function is implemented, the determining unit 25 first calculates $freq(A_{p-1}, A_p, S_{p-1}, S_p | S_p \in I)$, and uses the function to calculate $freq(A_{p-1}, A_p, S'_{p-1}, S'_p | S'_p \in I)$ for the combinations of $A_{p-1}, A_p, S_{p-1}$, and $S_p$ with which the calculated value exceeds the threshold it.

In a modification of the present invention, as the methods of array data generation and data extraction, not including the processing by the determining unit 25, processing that is different from the processing by the game-state-array-data generating unit 22, the action-array-data generating unit 23, and the data extracting unit 24 described in the context of this embodiment may be executed. In this case, the flowchart shown in FIG. 5 need not include step 102.

In a modification of this invention, when there are 2,000 kinds of cards in the game, each state vector is an N-dimensional vector including N card elements concerning cards that appeared at least once among $c_j$ (j=1 to 2,000). In this case, the value of N may vary among individual battles, i.e., among individual replay-log element groups.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

10 Estimating device
11 Processor
12 Input device
13 Display device
14 Storage device
15 Communication device
16 Bus
21 Labelling unit
22 Game-state-array-data generating unit
23 Action-array-data generating unit
24 Data extracting unit
25 Determining unit
40 Game screen
41 Card
42 Hand
43 Field
44 Stock
45 Character

The invention claimed is:

1. A method comprising:
generating, by a computer, a virtual environment for executing a game service of a computer game,
wherein the virtual environment employs a virtual game server, a virtual terminal device, and a virtual database server to produce an end-to-end virtualization of the computer game, and
wherein the game service is provided by the virtual game server to the virtual terminal device via a network;
executing, by the computer, a plurality of auto-plays of the game service using the virtual environment to produce a plurality of game logs;
detecting, by the computer and during a respective auto-play among the plurality of auto-plays, a game error in a respective game log among the plurality of game logs;
assigning, by the computer, an irregular label to a first game log among the plurality of game logs in response to detecting the game error to produce a plurality of irregular-log-data arrays;
assigning, by the computer, a regular label to a second game log among the plurality of game logs in response to detecting no error occurred to produce a plurality of regular-log-data arrays;
determining, by the computer, an action preceding an occurrence of the game error in the respective auto-play and a game state element relating to the action using a respective irregular-log-data array among the plurality of irregular-log-data arrays; and
determining, by the computer, whether a combination of the action and the game state element is a cause of the occurrence of the game error based on a degree of presence of the combination in the plurality of irregular- log-data arrays and a degree of presence of the combination in the plurality of regular-log-data arrays.

2. The method according to claim 1, wherein determining the combination of the action and the game state element is the cause of the occurrence of the game error is further based on a ratio of a first value based on the degree of presence of the combination in the plurality of irregular-log-data arrays to a second value based on the degree of presence of the combination in the plurality of regular-log-data arrays being greater than or equal to a prescribed value.

3. The method according to claim 1, the method comprising:
extracting the game state element from a plurality of game state elements in the respective auto-play.

4. The method according to claim 1, wherein determining the cause of the occurrence of the game error is based on one action immediately preceding the occurrence of the game error in the respective auto-play.

5. The method according to claim 1, wherein determining the cause of the occurrence of the game error is based on two or more actions immediately preceding the occurrence of the game error in the respective auto-play.

6. A non-transitory computer readable medium storing a program for causing the computer to execute the method according to claim 1.

7. An estimating system comprising:
a processor; and
a memory connected to the processor, wherein the memory comprises a program configured to perform a method comprising:
generating a virtual environment for executing a game service of a computer game,
wherein the virtual environment employs a virtual game server, a virtual terminal device, and a virtual database server to produce an end-to-end virtualization of the computer game, and
wherein the game service is provided by the virtual game server to the virtual terminal device via a network;
executing a plurality of auto-plays of the game service using the virtual environment to produce a plurality of game logs;
detecting, during a respective auto-play among the plurality of auto-plays, a game error in a respective game log among the plurality of game logs;
assigning an irregular label to a first game log among the plurality of game logs in response to detecting the game error to produce a plurality of irregular-log-data arrays;
assigning a regular label to a second game log among the plurality of game logs in response to detecting no error occurred to produce a plurality of regular-log-data arrays;
determining an action preceding an occurrence of the game error in the respective auto-play and a game state element relating to the action using a respective irregular-log-data array among the plurality of irregular-log-data arrays; and
determining whether a combination of the action and the game state element is a cause of the occurrence of the game error based on a degree of presence of the combination in the plurality of irregular-log-data arrays and a degree of presence of the combination in the plurality of regular-log-data arrays.

8. An estimating device comprising:
a processor; and
a memory connected to the processor, wherein the memory comprises a program configured to perform a method comprising:
generating a virtual environment for executing a game service of a computer game,
wherein the virtual environment employs a virtual game server, a virtual terminal device, and a virtual database server to produce an end-to-end virtualization of the computer game, and
wherein the game service is provided by the virtual game server to the virtual terminal device via a network;
executing a plurality of auto-plays of the game service using the virtual environment to produce a plurality of game logs;
wherein the plurality of game logs comprise a plurality of irregular-log-data arrays that are assigned an irregular label in response to detecting at least one game error, and
wherein the plurality of game logs comprise a plurality of regular-log-data arrays that are assigned an irregular label in response to detecting no game errors;
determining an action preceding an occurrence of the at least one game error in a respective auto-play among the plurality of auto-plays and a game state element relating to the action using a respective irregular-log-data array among the plurality of irregular-log-data arrays; and
determining whether a combination of the action and the game state element is a cause of the occurrence of the at least one game error based on a degree of presence of the combination in the plurality of irregular-log-data arrays and a degree of presence of the combination in the plurality of regular-log-data arrays.

\* \* \* \* \*